Jan. 16, 1951 R. SUMNER 2,538,284
FORMING TOOL
Filed May 28, 1948 3 Sheets-Sheet 1
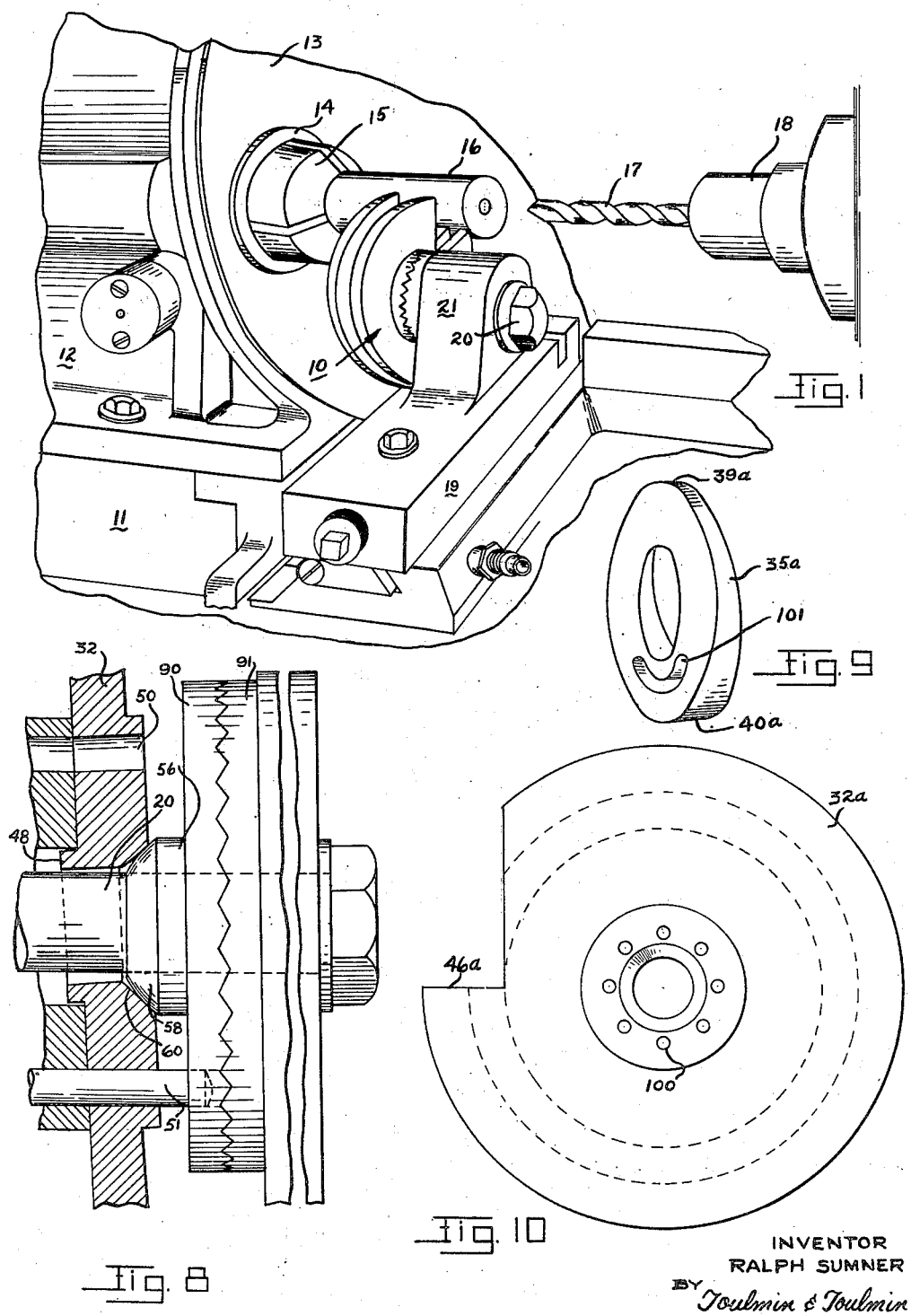
INVENTOR
RALPH SUMNER
BY Toulmin & Toulmin
ATTORNEYS

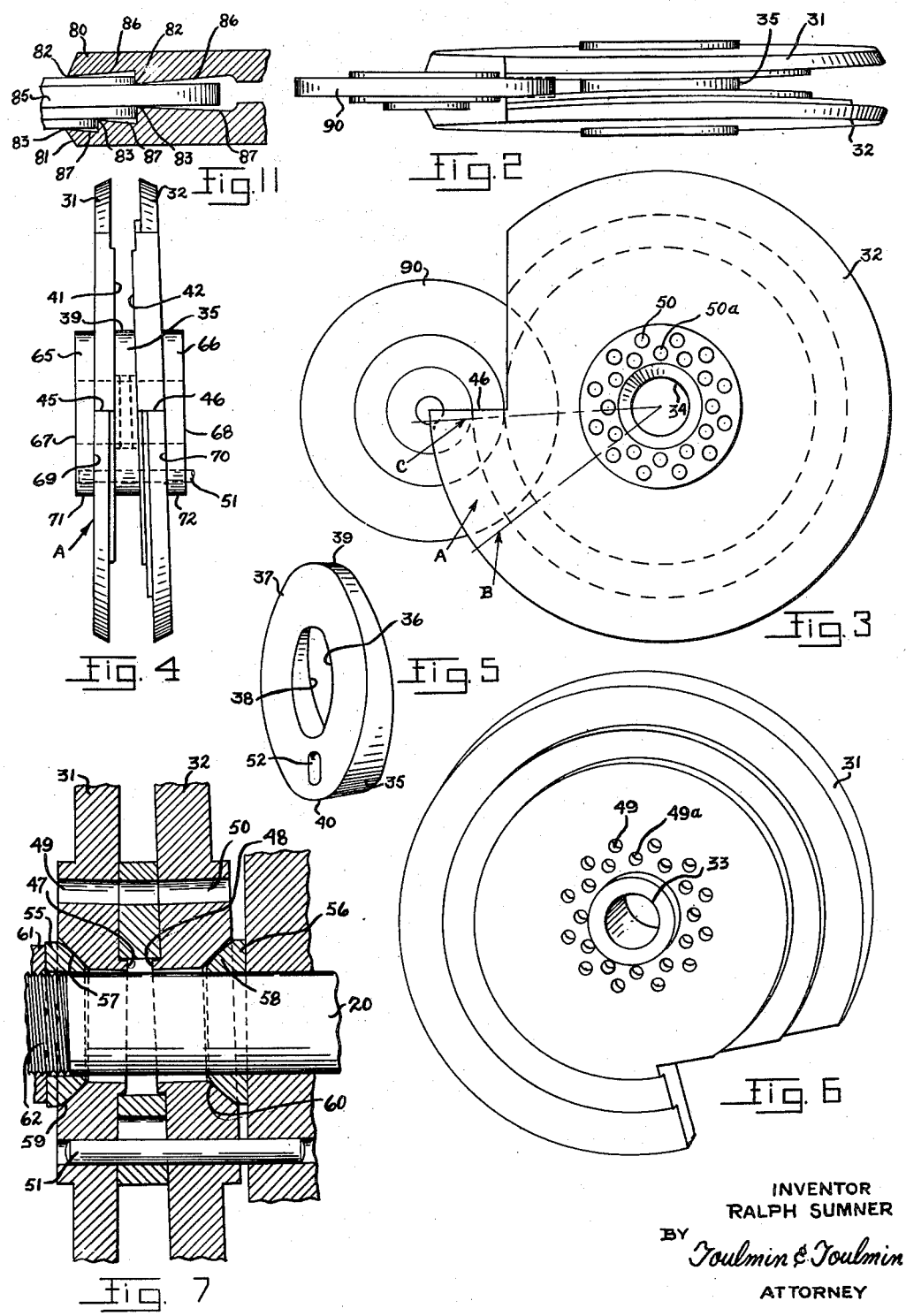

Jan. 16, 1951 R. SUMNER 2,538,284
FORMING TOOL
Filed May 28, 1948 3 Sheets-Sheet 3

INVENTOR
RALPH SUMNER
BY
Toulmin & Toulmin
ATTORNEYS

Patented Jan. 16, 1951

2,538,284

UNITED STATES PATENT OFFICE 2,538,284

FORMING TOOL

Ralph Sumner, Dayton, Ohio

Application May 28, 1948, Serial No. 29,725

5 Claims. (Cl. 29—103)

This invention relates to forming tools for use on turning machines such as lathes and screw machines, and others.

The use of forming tools, or turning tools to form-cut work-pieces wherein the forming tool consists of a pair of discs positioned in spaced relationship with a segment of the periphery of the discs removed to provide a radial cutting edge is known in the machine tool art. However, when using the forming tools of the present day art for form-turning finished articles, it is only possible to obtain a very few regrindings of the tool before it must be discarded. The major portion of the periphery of the tool is wasted each time a re-sharpening or regrinding of the tool is required. Usually, four or five or six grindings or re-sharpenings is about all that can be obtained with the usual type of form-turning tool. Waste of this kind involves many thousands of dollars in the average manufacturing plant.

Thus, it is an object of this invention to provide a form-turning tool of the disc type wherein substantially the entire periphery of the disc can be used in machining operations.

It is another object of the invention to provide a form-turning tool in accordance with the prior object wherein the discs of the form-turning tool are set angularly relative to one another by means of a wedge-shaped spacer between the discs so that grinding of relief areas in the tool is eliminated, and thus avoid a large wastage of useful cutting surface of the tool.

Still another object of the invention is to provide a form-turning tool in accordance with the foregoing objects wherein it is provided with means for aligning the angularly disposed discs coaxial with a spindle shaft on which they are mounted with the radial cutting edge normal to the spindle shaft.

Further objects and advantages will become apparent from the drawings and the following description.

In the drawings:

Figure 1 illustrates a machine on which a form-turning tool of this invention is applied.

Figure 2 is a top plan view of the forming tool of this invention.

Figure 3 is a side elevational view of the forming tool of Figure 2.

Figure 4 is an end elevational view of the forming tool of Figure 2 as viewed from the left-hand side thereof.

Figure 5 is a perspective elevational view of a wedge-shaped disc that angularly positions the tool-cutting discs relative to each other.

Figure 6 is a perspective elevational view of one of the tool-cutting discs.

Figure 7 is a vertical cross-sectional view illustrating the mounting of the forming tool of this invention on a spindle shaft.

Figure 8 illustrates the mounting of the tool on the toolholder of a machine.

Figure 9 illustrates a modified arrangement of the wedge-shaped spacing disc.

Figure 10 is a side elevational view of a slightly modified form of the tool discs.

Figure 11 is a cross-sectional view illustrating the manner of grinding of a tool according to the prior art.

Figure 17:
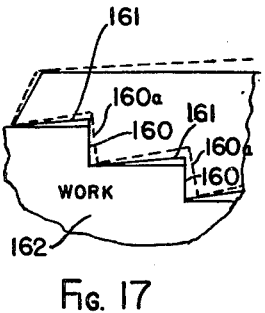
Figure 17 is a line diagram illustrating the manner of calculating the clearances and cutting edges of the forming tool.

In this invention the form-turning tool or forming tool 10, shown in Figure 1, is adapted to be used on any conventional turning machine, such as a lathe or a screw machine.

In Figure 1 the form-turning tool 10 is illustrated for use on a four-spindle automatic chucking machine in which only one of the spindles of the machine is illustrated.

The machine consists of a bed 11 having a gearhead 12 that drives an index plate 13. The index plate carries a plurality of spindles, one of which is shown at 14, which carries a chucking collet 15. The bar stock 16 from which the work-pieces are made extends from the collet 15. The machine may have other work tools carried thereon such as the drill 17 supported in the driving spindle 18.

The form-turning tool 10 of this invention is adapted to be carried on a cross-slide 19 which may be operated automatically or manually. The form-turning tool 10 is carried on the cross-slide 19 by means of a spindle bolt 20 extending through the head 21.

The form-turning tool is more particularly illustrated in Figures 2 to 5, inclusive. The tool 10 consists of a pair of discs 31 and 32 each of which has an axial opening 33 and 34, respectively, to receive a spindle on which the discs are mounted, such as the spindle bolt 20 heretofore referred to.

A spacer disc 35 is positioned between the tool discs 31 and 32. This spacer 25 is provided with an axial opening 36 which also passes over a spindle on which the tool is mounted. The side faces 37 and 38 of the spacer 35 are positioned angular to each other relative to a plane extending between the faces normal to the axis of the disc, thus arranging the disc in the form of a wedge-form having a thin portion 39 and a thick portion 40 on diametrically opposite peripheral edges thereof.

The inner faces 41 and 42 of the tool discs 31 and 32 respectively are planar surfaces that engage the angularly disposed faces 37 and 38 of the wedge-form or wedge-shaped disc 35. Thus, when the spacer 35 is positioned between the planar faces 41 and 42 of the tool discs 31 and 32, the discs are set angular to one another as shown in the plan view of Figure 2 and the edge view of Figure 4.

The wedge-form 35 is positioned between the tool discs 31 and 32 in such a manner that a line passing between the median points of the thin edge 39 and the thick edge 40 of the wedge-form 35 will be substantially normal to the radial cutting edges 45 and 46 provided on the tool discs 31 and 32 upon removal of a segmental portion of the discs, as illustrated in Figure 3.

The tool discs 31 and 32 are provided with annular ledges 47 and 48 that extend within the opening 36 of the spacer disc 35 to coaxially align the tool discs and the spaced disc, and thus insure a predetermined positioning of the elements relative to each other.

To align the cutting edges 45 and 46 of the tool discs 31 and 32 respectively in a common plane that is parallel with the axis through the tool, the tool discs 31 and 32 are each provided with a series of circumferentially positioned holes 49 and 50, respectively. These holes 49 and 50 align coaxially when they are in alignment with the thick portion 40 of the spacer disc 35, as shown in Figure 7. An aligning pin 51 extends through the holes 49 and 50 and through a corresponding coaxially aligned elongated hole 52 provided in the spacer 35. This pin, therefore, performs two functions, namely, that of maintaining the wedge-shaped spacer 35 in its selected position relative to the tool discs 31 and 32 and maintains the tool discs 31 and 32 in their selected position to maintain the cutting edges 45 and 46 thereof in a common plane. If desired, a plurality of aligning pins could be placed through the assembly by providing a plurality of holes 52 in the spaces 35.

As shown in Figures 3 and 6 there are two rows of circumferentially positioned holes 50 and 50a in the disc 32, and 49 and 49a in the disc 31. In the spacer 35 there is positioned the elongated hole 52 which coaxially aligns with the respective circumferential positions of the holes 50 and 50a and 49 and 49a of the respective tool discs. It will be noted that the holes 50 and 50a and 49 and 49a are disposed in staggered relationship, while the elongated hole 52 is in aligned radial relationship. The arrangement is therefore such that a small degree of rotation of the tool discs 31 and 32 will align the respective holes with one another so that actually alignment can occur between the holes upon rotation of the tool discs by only one-half the diameter of the holes. This has an advantage in that only a small amount of the periphery of the tool need be removed at each regrinding or sharpening thereof before the cutting edges 45 and 46 will be in radial alignment with the respective holes, and thus necessitate only a small removal of the periphery of the tool at each sharpening.

The assembled tool is adapted to be mounted on a spindle bolt 20 and may be supported between clamp members 55 and 56, each of which has a spherical surface 57 and 58, respectively, which engages the conical surfaces 59 and 60 provided in the tool discs 31 and 32, respectively. Thus, when the draw-bolt 61 is drawn upon the threaded portion 62 of the spindle 20, the tool assembly will be placed coaxial on the spindle 20 with a plane through the median point between the tool discs 31 and 32 normal to the axis of the spindle 20.

The same effect can be obtained by the clamping members 65 and 66 which have outer parallel faces 67 and 68 and inner angularly disposed faces 69 and 70 which engage the angularly disposed outer faces of the tool discs 31 and 32. The thin portions 71 and 72 of the clamp members 65 and 66 are disposed diametrically opposite to the thin portion 39 of the spacer 35 and are retained in this position upon assembly of the tool by means of the aligning pin 51.

When using forming tools of the disc type for rough and finished forming of work-pieces, it has been the standard practice to mount the discs parallel to each other normal to the axis of the spindle on which the discs are mounted. When this is done, all of the faces of the tool discs that are adapted to form cutting edges when a segment of the disc is removed, are parallel to each other. Thus, it has previously been necessary to remove a sufficient portion of the working face of the tools to provide relief for the work-piece as it enters the tool and thereby prevent scoring of the parallel faces formed on the work-piece.

In Figure 11 there is illustrated the prior practice of placing the tool discs 80 and 81 parallel to each other and normal to the axis of a spindle on which they are mounted. The tool discs are provided with the usual parallel work faces whereby a plurality of cutting edges 82 and 83 are formed on the cutting discs 81 and 80, respectively.

To prevent scoring of the side walls of the work-piece 85 as the tool advances toward the center of the bar stock to form the work-piece, the faces of discs are ground away to provide relief areas 86 and 87 on the respective tool discs. In addition to these normal relief areas at the cutting edge it is necessary to provide other vertical relief areas below the cutting edge to permit passage of the work-piece through the tool without scoring. These other areas are at least equal to and preferably slightly greater than the radius of the surface being turned on the work-piece.

An inspection of Figure 3 will show that when a work-piece 90 enters between the tool discs 31 and 32, a substantial portion of the tool discs below the cutting edges 45 and 46 is adjacent the work-piece 90. Thus, in the prior art practices it has been necessary to cut away the portion indicated by the letter A on Figure 3 to provide relief areas in which the formed article could rotate without causing scoring of the side walls of the work-piece, and also burning of the tool.

This prior practice involves a large amount of waste for the reason that the accurate form of the tool discs cannot again be obtained until the portion A of the tool discs, shown in Figure 3, would be cut away at least to the dotted line indicated B in Figure 3. Thus, that portion A of the tool would be lost for any useful purpose.

In this invention it will be noted, in Figure 4, that the tool discs are set angular to one another. Thus, that portion of the tool discs below the cutting edges tapers away from the side walls of the work-piece 90. This automatically gives the necessary relief below the cutting edges 45 and 46 of the tool discs to prevent engagement of the parallel side walls with the portion A of the tool discs. Thus, the only relief necessary is that which is required to relieve the actual cutting edge of the tool disc. Therefore, when the tool discs of this invention are re-ground for re-sharpening, it is only necessary to remove that portion of the tool discs to the dotted line indicated C. The portion of the tool discs between the dotted lines C and B is, therefore, saved, and a great number of regrindings of the tool can be obtained to utilize substantially the entire periphery of the tool discs.

In Figure 8 there is illustrated a tool mounting for carrying the tool discs on the machine which consists of a pair of serrated discs 90 and 91.

In Figures 9 and 10 there is illustrated a slightly modified form of the tool discs and the wedge spacer between them. In this modification the tool discs, represented by the tool disc 32a, is provided with only a single row of holes 100 to receive the aligning pins between the tool discs to align the cutting edges 46a.

The wedge-shaped spacer 35a is provided with an arcuate slot 101 through which the aligning pin extends between the tool discs placed against the side faces of the spacer 35a. This arrangement allows movement of the aligning pin radially around the axis of the spacer disc 35a to provide for adjustment of the re-ground cutting edges 46a normal to a line extending between the median points of the thin edge 39a and the thick edge 40a of the spacer 35a. Thus, substantially 100% utilization of the peripheral surface of the tool discs can be obtained. Here also, by providing a plurality of slots 101, a plurality of aligning pins can be used.

In Figures 12 to 16 there is illustrated a slightly modified arrangement of the form-turning tool illustrated in Figures 2 to 7 inclusive. In the forming tool illustrated in Figures 2 to 7 inclusive, the spacer disc 35 has been described as being positioned between the tool discs 31 and 32 in a position such that a line between the median points of the thin edge and thick edge of the wedge-shaped spacer 35 is normal to the cutting edge of the tool discs 31 and 32. This places the thin edge of the wedge-shaped spacer disc at the top of the forming tool.

However, in Figures 12 to 16 there is illustrated an arrangement of the tool discs and spacer disc wherein a line between the median points of the thin edge and thick edge of the spacer disc is positioned parallel to the cutting edge of the tool discs. This arrangement therefore places the thin edge of the wedge-shaped spacing disc in line with the cutting edge of the tool discs.

The form-turning tool of the modified arrangement consists of the tool discs 131 and 132 that are similar in construction to the tool discs 31 and 32 previously described. The tool discs are provided with a cut-away portion 133 to form a cutting ledge or edge 146.

A spacer disc 135 is placed between the tool discs 131 and 132. This spacer disc 135 has opposite angular faces like that of the spacer disc 35 and therefore is in the form of a wedge form.

This spacer disc 135 is placed between the tool discs 131 and 132 in a position such that a line between the median points of the thin edge 139 and the thick edge 140 of the spacer disc 135 is parallel to the cutting edge 146 of the tool discs 131 and 132. With the spacer disc 135 positioned between the tool discs 131 and 132 in this manner, the tool discs will be positioned angular to one another as illustrated in the top plan view of the forming tool shown in Figure 12.

Figure 14:
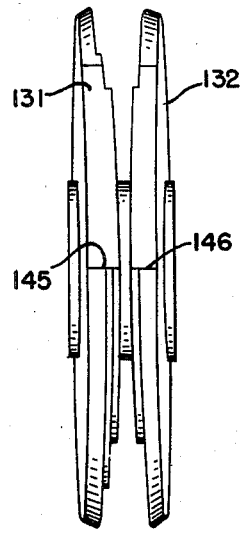
Figure 14 is an edge elevational view of the forming tool of Figures 12 and 13 taken in a direction looking at the left hand edge of the tool of Figure 13.
Figure 13:
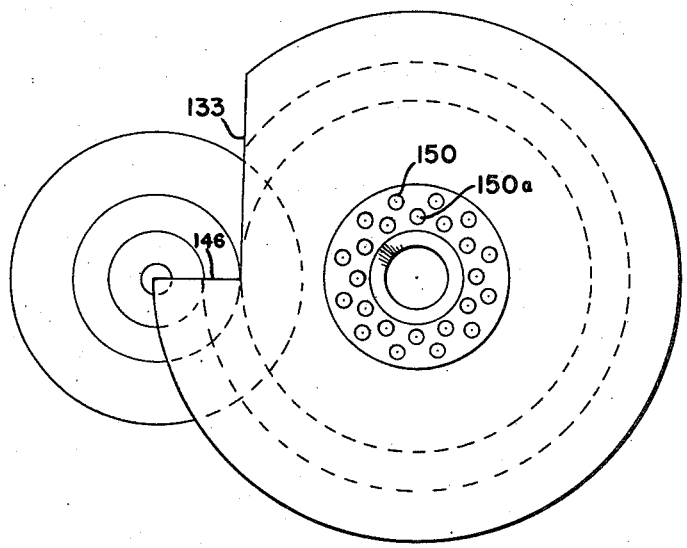
Figure 13 is a side elevational view of the forming tool of Figure 2.

The cutting edge 145 of the tool disc 131 and the cutting edge 146 of the tool disc 132 are positioned in a plane extending radially of the axis of the tool discs, as shown in Figures 13 and 14.

With the thin edge of the spacer disc 135 being positioned in alignment with the cutting edges 145 and 146 of the tool discs, the angular position of the tool discs obtained thusly will provide for tool relief clearance below the cutting edges 145 and 146. As shown in Figure 14, the angular positioning of the tool discs is such that the arcuate edges and faces of the tool discs below the cutting edges 145 and 146 recede from a plane normal to the axis of the cutting discs, thus providing the needed tool clearance to allow the work-piece formed by the forming tool to pass between the tool discs 131 and 132 below the cutting edges 145 and 146 without binding, thus eliminating scoring of the work-piece as it passes below the cutting edges 145 and 146.

Figure 16:
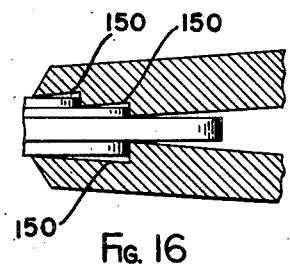
Figure 16 is an enlarged cross-sectional view taken at the cutting edge of the forming tool to illustrate tool clearances.
Figure 15:
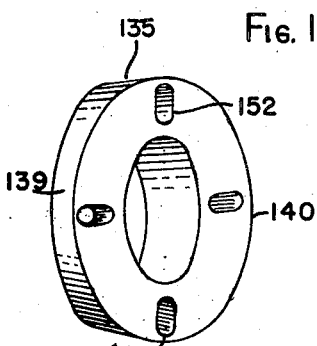
Figure 15 is a perspective elevational view of a spacer disc used in the tool illustrated in Figures 12 to 14.

In Figure 16 there is illustrated the tool clearance that is provided on the side edges of the forming tools to prevent scoring of the sides of the work-piece as the tool moves into the stock, the clearances 150 being provided for this purpose.

The tool discs 131 and 132 are provided with a series of holes 150 and 150a which provide aligning holes for the tool discs in the same manner as previously described with reference to the tool discs 31 and 32. In this instance, however, the spacer disc 135 is illustrated as being provided with four radially positioned holes 152, each adapted to receive an aligning pin in the manner previously described.

In Figure 17 there is illustrated the manner by which the tool discs 131 and 132 are ground with their cutting edges in comparison to previous standard practice.

It has previously been stated that previous standard practice was to place the tool discs 131 and 132 parallel to one another, suitable tool clearance being provided under these circumstances in the manner previously described. Thus, in the previous practice, the cutting edges 160 of the tool disc were held parallel to the axis of the tool discs if a right angle cut was to be made, it being understood that angular cuts from this right angle cut would require angular placement of the cutting edges 160 accordingly. The usual tool clearance 161 was also provided according to the previous standard practice. In the line diagram of Figure 17 the work is shown at 162.

Figure 12:
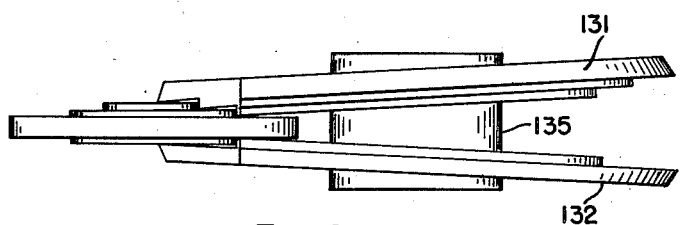
Figure 12 is a plan view of a modified arrangement of the forming tool of this invention incorporating the same principles as that disclosed in Figure 3.

It will be appreciated that with the tool discs 131 and 132 being positioned angular to one another as illustrated in Figures 12 to 13 with the thin edge of the spacer disc 135 in alignment with the cutting edges 145 and 146 that the angular displacement will alter the angular arrangement of the cutting edges 160 and the tool clearance 161. If the tool would be ground according to previous normal practice, the cutting edges 160 would become angular edges 160a, shown in dotted lines, rather than edges for cutting a right angle. Thus, the angle of the cutting edges 160 must be recalculated in the tool discs 131 and 132 to take into consideration the angular displacement of the tool discs relative to a plane normal to the axis of the tool discs. Also, the tool clearance angles 161 will also be recalculated in like manner.

While this recalculation or refiguring of the position of the cutting edges and tool clearances is required when the arrangement of the tool shown in Figure 12 is used, yet this recalculation is not required when the arrangement of the tool illustrated in Figure 2 is used.

It will be appreciated that in the arrangement shown in Figure 2 that all surfaces and lines in radial alignment with the axis of the tool discs and the cutting edges 45 and 46 will remain parallel to a line normal to the axis of the tool discs when the tool discs are positioned angularly to one another in the manner shown in Figure 2.

While the device disclosed and described herein constitutes a preferred form of the invention, yet it will be understood that mechanical alterations can be made without departing from the spirit of the invention, and that all modifications that fall within the scope of the appended claims are intended to be included herein.

Having thus fully described my invention, what I claim as new and desire to secure by Letters Patent is:

1. A forming tool adapted for use on a turning machine comprising, a pair of tool discs forming planar faces at different levels therebetween with the discs positioned coaxial to each other and having an edge portion thereof cut away forming a radial cutting edge, a spacer disc between said tool discs having opposite face sides angular to one another providing a wedge form between said tool discs, said tool discs being angularly supported relative to one another by said face sides of said wedge form, said wedge form being positioned relative to said tool discs that a line between the median points of the thin and thick edges thereof is substantially normal to the radial cutting edge formed in the tool discs, aligning means extending between each of said tool discs and said spacer disc to coaxially align the said spacer disc and the said tool discs, and additional aligning means between said tool discs to maintain the radial cutting edge formed in the tool discs in a plane parallel to the axis through the said discs.

2. A forming tool adapted for use on a turning machine comprising, a pair of tool discs forming planar faces at different levels therebetween with the discs positioned coaxial to each other and having an edge portion thereof cut away forming a radial cutting edge, a spacer disc between said tool discs having opposite face sides angular to one another providing a wedge form between said tool discs, said tool discs being angularly supported relative to one another by said face sides of said wedge form, said wedge form being positioned relative to said tool discs that a line between the median points of the thin and thick edges thereof is substantially normal to the radial cutting edge formed in the tool discs, said spacer disc having an annular axial opening therein, and an annular ledge on each of said tool discs disposed within said annular opening in said spacer disc and engaging the same to coaxially align said tool discs and said spacer disc.

3. A forming tool adapted for use on a turning machine comprising, a pair of tool discs having planar faces at different levels on one side thereof and having an edge portion thereof cut away forming a radial cutting edge, said discs being positioned with the planar faces thereof facing each other, and a spacer disc between said tool discs having opposite face sides angular to one another providing a wedge form between said tool discs, said tool discs being angularly supported relative to one another by said face sides of said wedge form, said wedge form being positioned relative to said tool discs that a line between the median points of the thin and thick edges thereof is parallel with the radial cutting edge formed in the tool discs.

4. A forming tool adapted for use on a turning machine comprising, a pair of tool discs forming planar faces at different levels therebetween with the discs positioned coaxial to each other and having an edge portion thereof cut away forming a radial cutting edge, a spacer disc between said tool discs having opposite face sides angular to one another providing a wedge form between said tool discs, said tool discs being angularly supported relative to one another by said face sides of said wedge form, said wedge form being positioned relative to said tool discs that a line betwen the median points of the thin and thick edges thereof is parallel with the radial cutting edge formed in the tool discs, and pin means extending between said tool discs and through said wedge form to maintain said tool discs in exact predetermined position relative to each other and relative to said wedge form to maintain the radial cutting edges provided thereon in a plane through said line parallel to the axis of said discs.

5. A forming tool adapted for use on a turning machine comprising, a pair of tool discs each having annular coaxial stepped portions thereon at different levels, each of said stepped portions on each of said discs having a uniform thickness throughout the extent of the stepped portion, said discs being positioned coaxial to each other and having an edge portion thereof cut away forming a radial cutting edge, and a spacer disc between said tool discs having opposite face sides angular to one another of equal angle relative to a plane through the spacer normal to the axis thereof providing a wedge form between said tool discs, said tool discs being angularly supported relative to one another by said face sides of said wedge form at equal angles relative to a plane through said spacer normal to the axis of the assembled spacer and tool discs, said wedge form being positioned relative to said tool discs that a line between the median points of the thin and thick edges thereof is substantially normal to the radial cutting edge formed in the tool discs.

RALPH SUMNER.

REFERENCES CITED

The following references are of record in the file of this patent:

UNITED STATES PATENTS

| Number | Name | Date |
|---|---|---|
| 301,314 | Woerd | July 1, 1884 |
| 1,632,528 | Zeidler | June 14, 1927 |